United States Patent
Palmer et al.

(10) Patent No.: US 9,643,786 B1
(45) Date of Patent: May 9, 2017

(54) FOOD-GRADE TELESCOPING BELT TIGHTENER

(71) Applicant: Bryant Products, Inc., Ixonia, WI (US)

(72) Inventors: Adam Lee Palmer, Waukesha, WI (US); Collyn McKinley Rankin, Pewaukee, WI (US); Jon Michael Helt, Lake Mills, WI (US); Todd A. Brennecke, Watertown, WI (US); Daniel M. Genz, Watertown, WI (US); Frederick H. Thimmel, Hartland, WI (US)

(73) Assignee: Bryant Products, Inc., Ixonia, WI (US)

( * ) Notice: Subject to any disclaimer, the term of this patent is extended or adjusted under 35 U.S.C. 154(b) by 0 days.

(21) Appl. No.: 15/160,464

(22) Filed: May 20, 2016

(51) Int. Cl.
*B65G 23/44* (2006.01)

(52) U.S. Cl.
CPC .......... *B65G 23/44* (2013.01); *B65G 2207/26* (2013.01)

(58) Field of Classification Search
CPC ............................. B65G 23/44; B65G 2207/26
USPC ........................................................ 198/816
See application file for complete search history.

(56) References Cited

U.S. PATENT DOCUMENTS

| | | | |
|---|---|---|---|
| 2,519,203 A | 8/1950 | Stoecklin | |
| 2,939,571 A | 6/1960 | Robertson | |
| 3,069,180 A | 12/1963 | Morlik | |
| 3,118,315 A | 1/1964 | Loosli | |
| 3,284,114 A | 11/1966 | McCord et al. | |
| 3,581,588 A * | 6/1971 | Eftefield | F16H 7/14 474/110 |
| 3,832,910 A | 9/1974 | Bryant | |
| 3,837,689 A | 9/1974 | Csatlos | |
| 3,921,793 A | 11/1975 | Hutchinson | |
| 4,561,538 A * | 12/1985 | Zwiebel | B65G 23/44 198/816 |
| 4,650,224 A | 3/1987 | Smith | |
| 4,803,804 A | 2/1989 | Bryant | |
| 5,030,173 A | 7/1991 | Bryant | |
| 5,054,608 A | 10/1991 | Bryant | |
| 5,259,821 A | 11/1993 | Bryant | |
| 6,170,645 B1 | 1/2001 | Mitchell | |
| 7,243,782 B2 | 7/2007 | Schlagel | |
| 7,338,400 B2 | 3/2008 | Pierjok | |
| 8,640,861 B2 | 2/2014 | Chellberg | |
| 8,910,778 B1 | 12/2014 | Francisco | |
| 8,967,373 B2 | 3/2015 | Nils | |
| D750,864 S | 3/2016 | Roessler | |

(Continued)

*Primary Examiner* — Mark A Deuble
(74) *Attorney, Agent, or Firm* — Craig A. Fieschko, Esq.; DeWitt Ross & Stevens S.C.

(57) ABSTRACT

A telescoping belt tightener for conveyors includes an elongated outer body and a slider tube inserted in one end, with the slider tube able to slide into and out of the outer body to varying lengths. An adjuster at an opposing end can be turned to extend or retract the slider tube from the outer body. A bearing collar, with a bearing cavity that fits a spherical bearing, is attached to the slider tube. A collar shield snugly fits with the bearing collar to keep contaminants from entering the bearing cavity. One or both ends of the outer body include a stopper for keeping contaminants from entering the outer body. The outer body is round and without standing surfaces on which food and debris could accumulate. The outer body and adjuster are unitary parts without crevices in which contaminants can collect. The belt tightener is well-suited for food-grade applications.

35 Claims, 3 Drawing Sheets

(56) References Cited

U.S. PATENT DOCUMENTS

2013/0049354 A1 2/2013 Chase et al.
2013/0277178 A1* 10/2013 Strieker ............... B65G 15/60
198/813

* cited by examiner

FOOD-GRADE TELESCOPING BELT TIGHTENER

FIELD OF THE INVENTION

This document concerns an invention relating generally to belt tightening assemblies for conveyor systems, and more specifically to food-grade telescoping take-up units for tensioning conveyor belts and chains.

BACKGROUND OF THE INVENTION

A conveyor system generally includes a flexible belt (often made of rubber) that loops about two rollers: a front drive roller that powers the conveyor system, and a tail roller. As the rollers rotate, the conveyor can carry ("convey") an object placed on the belt. Over time, the flexible belt tends to stretch and deform, resulting in the belt slipping over the rollers and the conveyor system being unable to effectively move the belt. To remedy such slippage, the tail roller is often provided with an extendable and retractable belt tightener that applies tension to the belt so that there is enough friction for the drive pulley to move the belt. The belt tightener is often used to apply tension during the life of the conveyor system. Belt tighteners ("take-up units") for conveyor and other endless belts are exemplified by the devices depicted in (for example): U.S. Pat. No. 3,832,910 to Bryant; U.S. Pat. No. 4,803,804 to Bryant; U.S. Pat. No. 5,030,173 to Bryant; U.S. Pat. No. 5,054,608 to Bryant; U.S. Pat. No. 5,259,821 to Bryant; and U.S. Pat. No. 9,371,189 to Brennecke et al. (the entireties of these patents being incorporated herein by reference).

As shown in FIGS. 1A and 1B, a conventional belt tightener 1 includes a "take-up" having an elongated inner sleeve/tube 5 of lesser diameter (girth) that extends from and retracts into a "body" 10 (an elongated outer sleeve/tube) of larger diameter (girth). Conventional belt tighteners also include a pillow block 15 that is secured to the take-up 5 via a bearing plate/mounting plate 20. The pillow block 15 receives a bearing 25 through which a roller shaft may pass.

The design of tightener 1 has been in use for many years, and it suffers from several noteworthy disadvantages. It includes many nuts and bolts that are collection points for contamination, which is undesirable especially in food-grade applications. The square shape provides a standing surface on which food and debris can accumulate, and makes cleaning more difficult because fluids can collect in small puddles on the level surfaces after washing. Moreover, food and debris can collect between the inner tube 5 and the outer tube 10, and between and around the bearing 25 and the pillow block 15. These and other failures are addressed by the exemplary improved belt tighteners discussed below and depicted in the attached figures.

SUMMARY OF THE INVENTION

The invention, which is defined by the claims set forth at the end of this document, is directed to telescoping tighteners which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring to FIGS. 2A, 2B, and 3, an exemplary telescoping belt tightening assembly 100 for conveyor systems includes an elongated outer body 110 with an opening 120 formed through its center. A slider assembly includes a slider tube 130 that extends into the opening 120 at a forward end 140 of the outer body 110, with the slider tube 130 able to slide into and out of the forward end 140 to varying lengths. An adjuster 160 extends out of a rear end 150 opposing the forward end 140, allowing a user to adjust the extent to which the slider tube 130 protrudes from the outer body 110. Extending from the slider tube 130 is a bearing collar 170 (which can be welded or otherwise fixed to the slider tube 130) with a bearing cavity 180 that fits a spherical bearing. A collar shield 190 snugly fits with the bearing collar 170 to restrict contaminants (such as food, debris, fluids, or any other undesirable material) from entering the bearing cavity 180. Each of the forward and rear ends 140, 150 of the outer body 110 includes a stopper 200 for restricting contaminants (such as food, debris, fluids, or any other undesirable material) from entering the outer body 110. The outer body 110 is smooth and rounded without flat sides on which debris could accumulate. These, and other features discussed below, help make the exemplary telescoping belt tightening assembly 100 particularly well-suited for use with food-grade applications.

Further advantages and features of the invention will be apparent from the remainder of this document in conjunction with the associated drawings.

DETAILED DESCRIPTION OF PREFERRED VERSIONS OF THE INVENTION

Figure 1A:
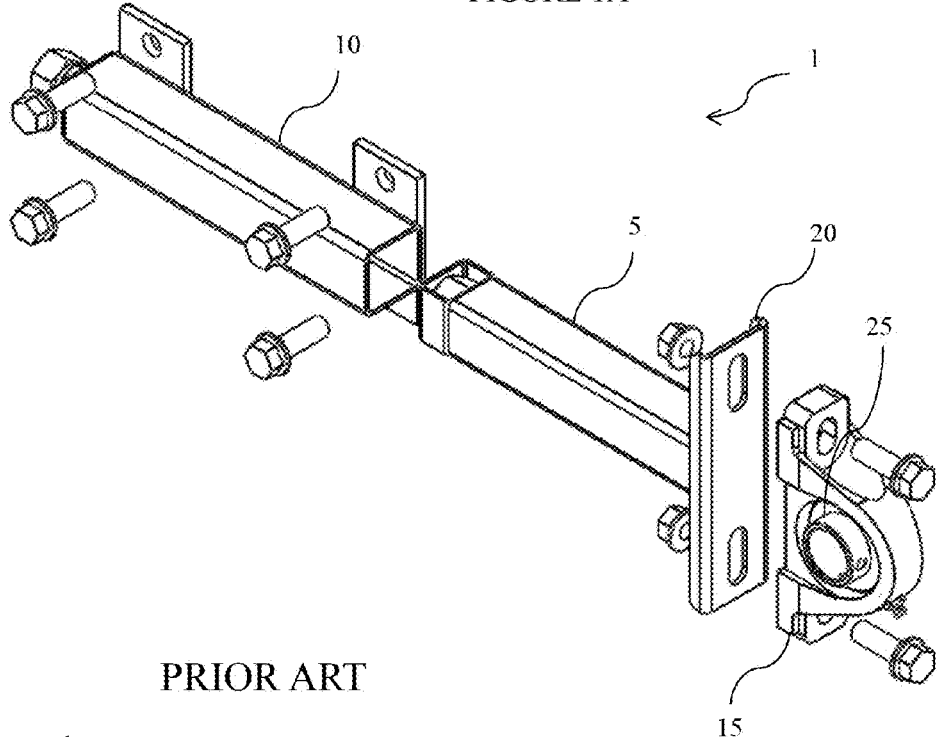
FIG. 1A is an exploded view of a conventional belt tightener assembly 1 with a pillow block 15, a mounting plate 20, and nuts and bolts for securing the pillow block 15 to the mounting plate 20.
Figure 1B:
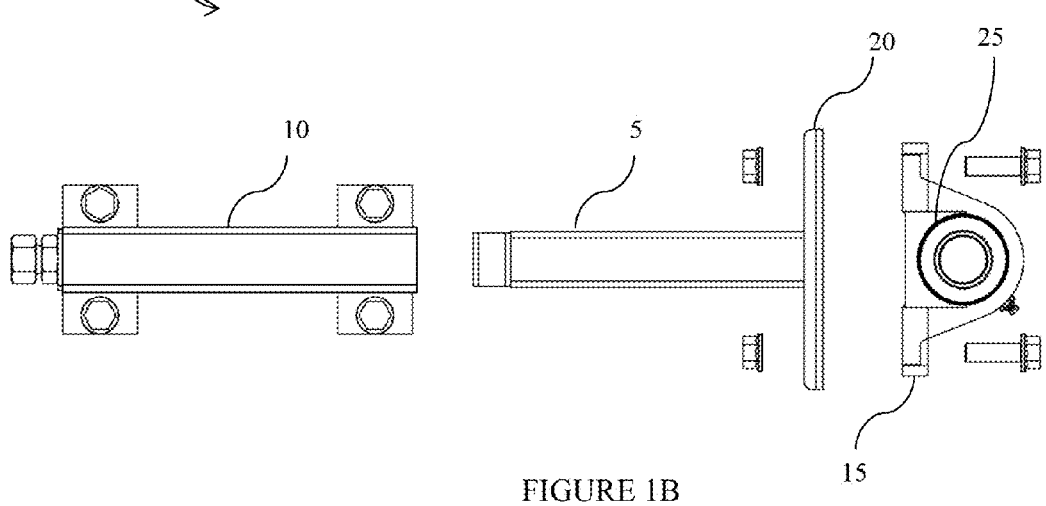
FIG. 1B is an alternative view of the conventional belt tightener assembly 1 of FIG. 1A.
Figure 2A:
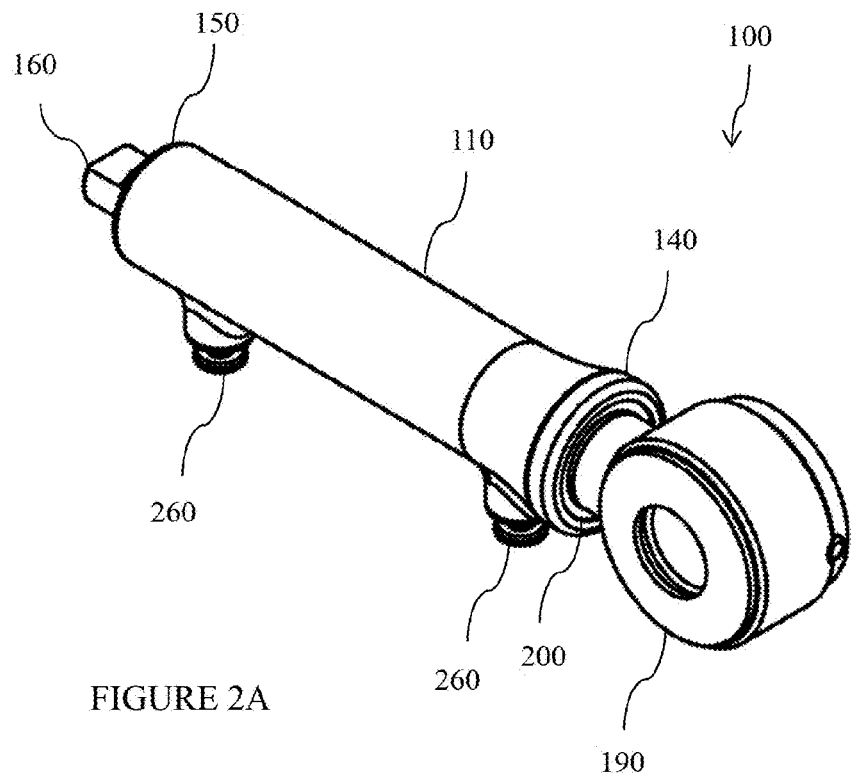
FIG. 2A is a perspective view of an exemplary belt tightening assembly 100 that is well-suited for food grade applications.
Figure 2B:
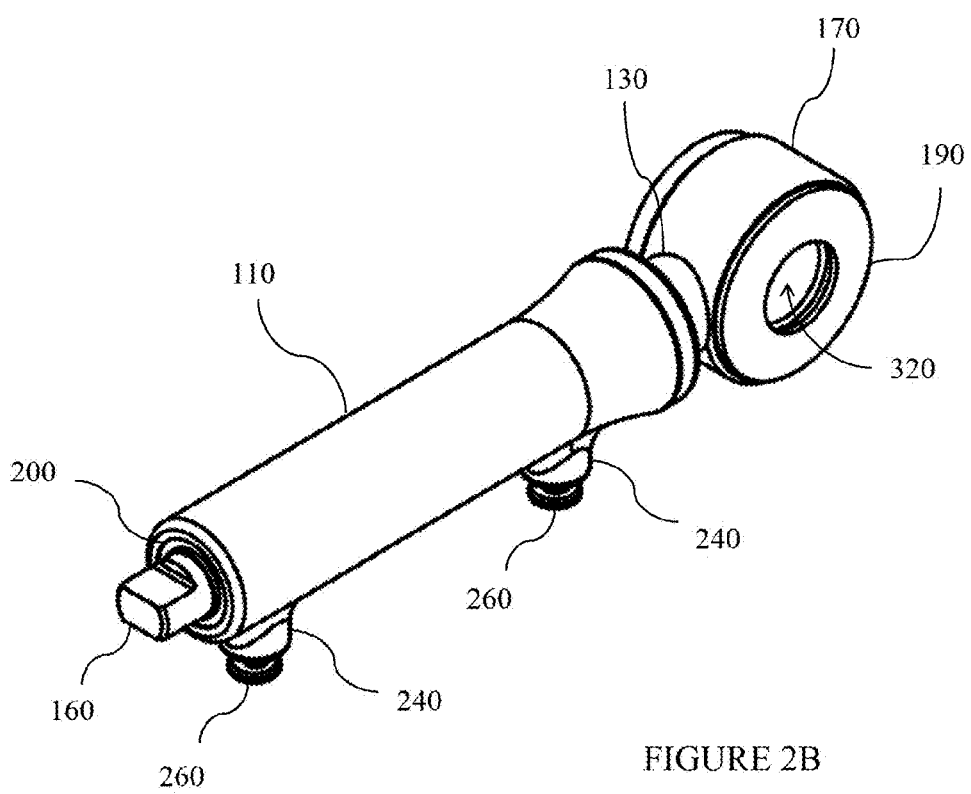
FIG. 2B is an alternative perspective view of the belt tightening assembly 100 of FIG. 2A.
Figure 3:
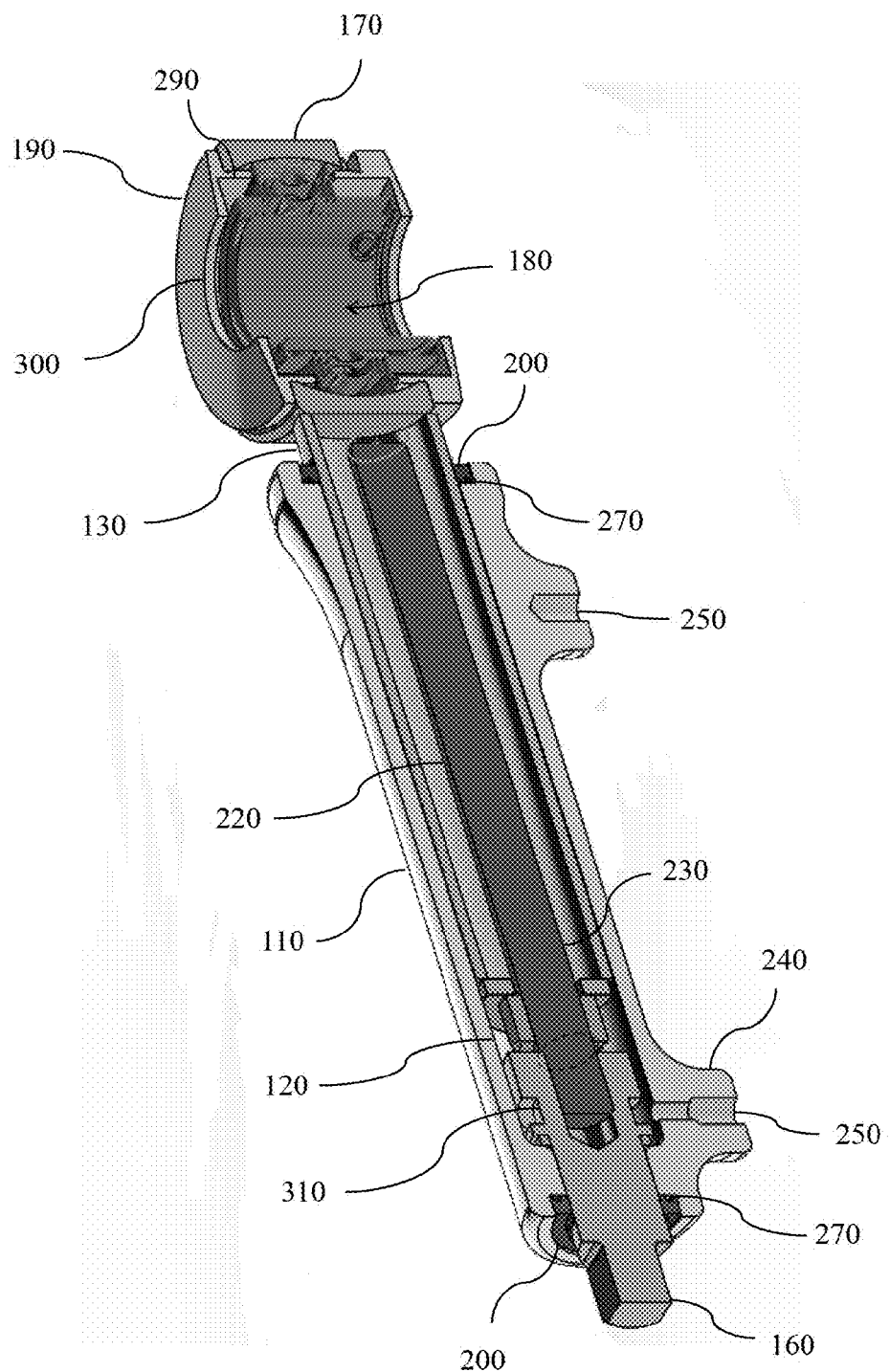
FIG. 3 is a cross-sectional view of an exemplary belt tightening assembly 100 showing a slider tube 130 inside an outer body 110.

Returning to FIGS. 2A, 2B, and 3, an exemplary belt tightening assembly 100 includes an outer body 110 extending from a forward end 140 to a rear end 150. A slider tube 130 is situated within the outer body 110 and extends out of the forward end 140. An adjustment assembly is partly situated within the outer body 110 and partly extends out of the rear end 150. Attached to the slider tube 130 is a bearing collar 170 having a bearing cavity 180 for receiving a spherical bearing that can be secured to a roller (not pictured) of a conveyor system. The outer body 110, which can be manufactured using a casting process, is a one-piece (unitary) body and not formed by joining two or more components (such as by welding). This helps avoid crevices and gaps at joints where contaminants (such as food, debris, fluids, bacteria, or any other undesirable material) can collect.

The slider tube 130 includes an internally-threaded tube aperture 220, and the adjustment assembly includes an externally-threaded rod 230 (with threads mated with the threads of the tube aperture 220) configured to be received in the slider tube 130 by threaded engagement with the tube aperture 220. The adjustment assembly includes an adjuster 160, forming (for example) a turnable/twistable knob, that is secured to the threaded rod 230 so that turning the adjuster 160 will also turn the threaded rod 230 to screw the threaded rod 230 into and out of the tube aperture 220. Screwing the threaded rod 230 out of the tube aperture 220 urges the slider tube 130 out from the forward end 140 of the outer body 110, and screwing the threaded rod 230 into the tube aperture 220 pulls the slider tube 130 back into the outer body 110. Like the outer body 110, the portion of the adjuster/knob 160 that protrudes out from the outer body 110 is preferably a unitary body that does not introduce crevices (at the intersection of two or more components) where contaminants can collect. To facilitate attachment to a conveyor system, the outer body 110 may include one or more pedestals 240 protruding radially from the outer body 110. Each pedestal 240 includes a pedestal aperture 250 for receiving a fastener 260 that can be used to secure the outer body 110 to a panel of the conveyor system. Like the outer body 110, the pedestals 240 are also rounded to facilitate cleaning and avoid standing surfaces for food and debris.

The outer body 110 preferably terminates in a forward shoulder 270 and/or a rear shoulder 270, each shoulder 270 defining a recess formed circumferentially around the end of the outer body 110. Stoppers 200 positioned at the forward and/or rear shoulders 270 are sized to fit snugly in the recesses as barriers to contaminants entering the outer body 110 as (for example) the slider tube 130 slides into and out of the outer body 110, or as the adjuster 160 is turned. The stoppers 200 are pliable, and they function as seals against food and debris that may have landed on the slider tube 130 and that should not be allowed into the outer body 110.

To help keep food and debris from collecting in the bearing cavity 180, one or more collar shields 190 may be used to cover at least a portion of the cavity as a barrier to contaminants. The collar shields 190 can be circular, with a shield leg 290 extending from a shield base 300. To install the collar shield 190, the collar shield 190 may be pressed onto the bearing collar 170 such that the shield leg 290 fits snugly against an inside surface of the bearing cavity 180, with the shield base 300 flat against an outer face of the bearing collar 170 so as to restrict debris from entering the bearing cavity 180 through a significant gap between the collar shield 190 and the bearing collar 170.

An exemplary method of using the belt tightening assembly 100 in a conveyor system involves installation of the outer body 110 in a conveyor system. A pair of fasteners 260 can be used to secure the outer body 110 to, for example, a side frame of the conveyor system (starting by sandwiching the side frame between the fasteners 260 and the pedestals 240, and screwing or otherwise inserting the fasteners 260 into the pedestals 240 to "trap" the side frame between the heads of the fasteners 260 and the pedestals 240). If not already installed, a spherical bearing can be placed into the bearing cavity 180, and a roller shaft of a roller can be secured to the bearing. A collar shield 190 can be inserted into the bearing collar 170, with the shield base 300 covering at least a portion of the bearing cavity 180 to keep out contaminants. The adjuster 160 can then be turned as needed to adjust how far out of the outer body 110 the slider tube 130 protrudes, and, consequently, how much tension is applied to the belt, chain, etc. that is being tightened.

Standard conveyor belt tighteners are not suitable for food applications in which the belt tighteners will be near or in contact with food. Standard bodies that are welded from many components tend to have crevices and hard-to-clean surfaces. For example, a traditional pillow block bearing assembly that would be attached to a bearing plate would introduce many unacceptable contact areas. Additionally, standard bodies are not sealed and allow food and liquids to enter and be trapped. Moreover, standard bodies are square and flat, allowing (for example) small puddles to form during cleaning or as a result of spills; standard bodies are also not rounded and smooth to encourage food and liquid to slide off, and are consequently not wash-down ready.

The outer body 110, which is preferably a casted body made of stainless steel, houses the adjustment assembly and slider assembly. The outer body's 110 rounded design, which reduces or eliminates standing surfaces for food and debris, facilitates easy cleaning of the outer body 110. The two rounded pedestals/bosses 240, which act as the "feet" of the outer body 110, have their centers drilled and tapped for easier mounting. The outer body 110 can be bored straight through to form the opening 120 for the slider/adjustment assemblies, and on one or both ends 140, 150 there is a bored shoulder 270 (with a recess) for a stopper 200 (i.e., an inset seal). Use of two tapped bosses 240 for mounting eliminates the need for the two flat plates welded to a body tube with four through holes for bolting, as found in standard units.

The adjustment assembly includes a machined adjuster 160 (which can be a machined bar with a flat knob) welded to the threaded rod 230. The machined adjuster 160 includes an adjuster groove 310 that can be used to lock the adjuster 160 in the outer body 110 using a set screw. Standard adjusters are retained in place using a welded nut on one side of an outer tube and nuts on the opposing side of the outer tube, providing additional havens for contaminants. The threaded rod 230 is threaded into the slider tube 130, and turning the adjuster 160 allows for the linear outward motion of the slider tube 130. By contrast, in standard adjusters, a hex nut is welded to the end of a threaded rod, and the welded hex nut is situated outside of the outer tube; this provides gaps and crevices where contaminants could collect.

The slider tube 130, which can be made of stainless steel, is encapsulated in the casted outer body 110 and is not exposed to food or liquid. The slider assembly includes the slider tube 130 welded to a machined bearing collar 170, which may also be made of stainless steel. The bearing is installed into the spherical bearing collar 170, and two collar shields 190 made with ultra-high-molecular-weight (UHMW) polyethylene (or other suitable plastics and non-plastics) snap in to cover the bearings. The collar shields/seals 190—which have a through hole 320 with dimensions substantially matching those of the shaft that will engage the bearing in the bearing collar 170—help prevent food from getting in small crevices in the bearing collar 170 and/or the bearing, and contains the bearing assembly so as to keep food away from moving components where food could become trapped.

To keep food and other contaminants from reaching the inside of the outer body 110, stoppers 200 (inset seals/"wiper" seals) wipe and help clean the slider tube 130 as the slider tube 130 slides into and out of the outer body 110. The stoppers 200, which can have a cross-section like that of wiper blades used to wipe windshields, may be molded pliable seals that are approved for food-grade applications. The adjustment assembly is segregated from food and liquid with the help of the stoppers 200 that keep food from getting into the outer body 110. The inset/wiper seals 200, the casted outer body 110 (which is not welded and is designed for ease of cleaning), and a bearing assembly with UHMW collar shields 190, help make the exemplary telescoping belt tightening assembly 100 well-suited for food-grade applications.

Initially, it must be kept in mind that the telescoping belt tightener assembly shown in the accompanying drawings and discussed above are merely exemplary, and may assume a wide variety of configurations different from those noted, and may use components different from those noted. It should also be understood that any terms referring to orientation and position used in this document are relative terms rather than absolute ones. Such terms should be regarded as words of convenience, rather than limiting terms.

Various preferred versions of the invention are shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

First, not all of the food-grade features necessarily need to be incorporated in a single take-up unit to enhance suitability for food-related applications. For example, rather than using a spherical bearing with a machined bearing collar, a bearing plate could be used, and a pillow block bearing could be attached. However, this would introduce undesirable surfaces/spaces where food could be trapped, making the take-up unit more difficult to clean.

Second, the shapes and dimensions could be modified in many different ways, such as by changing the shape of the adjuster so that it is not a flat knob as shown in the drawings, or by changing lengths, widths, diameters, etc. to accommodate different stroke lengths, conveyor systems, etc.

Preferred versions of the invention have been described above in order to illustrate how to make and use the invention. The invention is not intended to be limited to these versions, but rather is intended to be limited only by the claims set out below. Thus, the invention encompasses all different versions that fall literally or equivalently within the scope of these claims.

What is claimed is:

1. A telescoping belt tightening assembly for conveyor systems, the belt tightening assembly including:
   a. an elongated outer body:
      (1) with an opening extending therethrough,
      (2) terminating in a shoulder that defines a recess formed circumferentially about the outer body, and
      (3) including at least one pedestal protruding radially outwardly therefrom, the pedestal having an aperture extending therethrough for receiving a fastener;
   b. a slider tube sized to be receivable in the opening of the outer body, the slider tube being adjustably securable to the outer body such that the slider tube is extendable out of the outer body to varying lengths; and
   c. a stopper positioned at the shoulder of the outer body, the stopper being sized to fit snugly in the recess as a barrier to contaminants entering the outer body as the slider tube slides into and out of the outer body.

2. The assembly of claim 1 wherein the stopper is a pliable seal against food and debris landing on the slider tube.

3. The assembly of claim 1 wherein the outer body is substantially rounded without flat sides on which debris could accumulate.

4. The assembly of claim 1 wherein the outer body is formed as a unitary body, and not two or more parts joined together, so that the outer body does not have debris-collecting crevices where two more parts have been joined together.

5. The assembly of claim 4 wherein the outer body is casted.

6. The assembly of claim 1 further including a bearing collar extending from the slider tube, the bearing collar having a bearing cavity formed therein for receiving a bearing.

7. The assembly of claim 6 further including a collar shield covering a portion of the cavity as a barrier to contaminants entering the bearing cavity.

8. The assembly of claim 7 wherein the collar shield includes a shield leg that fits snugly against an inside surface of the bearing cavity.

9. The assembly of claim 1 wherein:
   a. the shoulder is a forward shoulder formed at a forward end of the outer body, the forward shoulder defining a forward recess;
   b. the stopper is a forward stopper positioned at the forward shoulder;
   c. the outer body further includes a rear shoulder formed at a rear end of the outer body,
      1) the rear end of the outer body opposing the forward end of the outer body;
      2) the rear shoulder defining a rear recess formed circumferentially about the outer body;
   d. the assembly further includes a second stopper that is sized to fit snugly in the rear recess as a barrier to contaminants entering the outer body from the rear end.

10. The assembly of claim 1 wherein the slider tube includes an internally-threaded tube aperture, the slider tube being sized to be receivable in the opening of the outer body.

11. The assembly of claim 10 further including an adjustment assembly having:
   a. a threaded rod configured to be received in the slider tube by threadably engaging the tube aperture;
   b. an adjuster protruding from a back end of the outer body, the adjuster being fixed to the threaded rod such that turning the adjuster will also turn the threaded rod to screw the threaded rod into and out of the tube aperture, wherein:
      1) screwing the threaded rod out of the tube aperture urges the slider tube out from a front end of the outer body, the front end of the outer body opposing the back end of the outer body; and
      2) screwing the threaded rod into the tube aperture retracts the slider tube into the front end of the outer body.

12. The assembly of claim 1 further including an adjuster which is manipulatable to adjust how far the slider tube extends out of the outer body, wherein the adjuster is a unitary body, and not two or more parts joined together, such that the adjuster does not have debris-collecting crevices at intersections of parts joined together.

13. A telescoping belt tightening assembly for conveyor systems, the belt tightening assembly including:
   a. an elongated outer body with an opening extending therethrough;
   b. a slider tube sized to be receivable in the opening of the outer body, the slider tube being adjustably securable to the outer body such that the slider tube is extendable out of the outer body to varying lengths, the slider tube terminating in a bearing collar, the bearing collar having a bearing cavity for receiving a bearing therein; and c. a collar shield covering a portion of the cavity as a barrier to contaminants entering the bearing collar, the collar shield having a shield leg that fits snugly against an inside surface of the bearing cavity.

14. The assembly of claim 13 wherein:
   a. the outer body includes a shoulder at one end thereof, the shoulder having a recess; and
   b. the belt tightening assembly further includes a pliable stopper sized to fit snugly in the recess of the shoulder.

15. The assembly of claim 13 wherein the outer body is substantially rounded without flat sides on which debris could accumulate.

16. The assembly of claim 13 further including:
   a. an internally-threaded tube aperture formed longitudinally through the slider tube; and
   b. an adjustment assembly having:
      1) a threaded rod configured to be received in the slider tube by threadably engaging the tube aperture;
      2) an adjuster protruding from a rear end of the outer body, the adjuster being fixed to the threaded rod such that turning the adjuster will also turn the threaded rod to screw the threaded rod into and out of the tube aperture, wherein:
         a) screwing the threaded rod out of the tube aperture causes the slider tube to extend out from a forward end of the outer body, the forward end opposing the rear end of the outer body; and
         b) screwing the threaded rod into the tube aperture causes the slider tube to retract into forward end of the outer body.

17. The assembly of claim 13 wherein:
   a. the slider tube extends out of a forward end of the outer body;
   b. the assembly further includes a stopper positioned at the forward end of the outer body to seal against contaminants entering the outer body as the slider tube slides into the outer body.

18. A method of using a telescoping belt tightening assembly in a conveyor system,
   a. the belt tightening assembly including:
      1) an elongated outer body with a substantially rounded exterior, the outer body extending from a rear end to a forward end, the outer body having:
         a) an opening extending therethrough; and
         b) a pair of pedestals protruding radially outwardly therefrom, each pedestal having an aperture extending therethrough for receiving a fastener used to secure the outer body to a conveyor system;
      2) a slider tube sized to be receivable in the opening of the outer body, the slider tube:
         a) being adjustably securable to the outer body such that the slider tube is extendable out of the forward end of the outer body to varying lengths; and
         b) terminating in a bearing collar, the bearing collar having a bearing cavity for receiving a bearing therein; and
      3) a collar shield for covering a portion of the cavity as a barrier to contaminants entering the bearing collar, the collar shield having a shield leg that fits snugly against an inside surface of the bearing cavity;
   b. the method including the steps of:
      1) placing a bearing in the bearing collar;
      2) inserting the collar shield over the bearing collar to cover a portion of the bearing cavity; and
      3) placing the pair of pedestals against a conveyor system and securing the outer body to the conveyor system using a pair of fasteners.

19. The method of claim 18 wherein:
   a. the outer body includes a rear shoulder at the rear end, and a forward shoulder at the forward end, each of the rear and forward shoulders defining a recess formed circumferentially about the outer body;
   b. the belt tightening assembly further includes:
      1) a rear stopper positioned at the rear shoulder of the outer body, and a forward stopper positioned at the forward end of the outer body, each of the rear and forward stoppers being sized to fit snugly in the recess as a barrier to contaminants entering the outer body;
      2) an adjuster protruding from the rear end of the outer body, the adjuster being configured such that turning the adjuster causes the slider tube to extend out from the forward end of the outer body; and
   c. the method further includes the step of turning the adjuster to slide the slider tube out of the outer body.

20. A telescoping belt tightening assembly for conveyor systems, the belt tightening assembly including:
   a. an elongated outer body with an opening extending therethrough, the outer body terminating in a shoulder that defines a recess formed circumferentially about the outer body;
   b. a slider tube sized to be receivable in the opening of the outer body, the slider tube being adjustably securable to the outer body such that the slider tube is extendable out of the outer body to varying lengths;
   c. a bearing collar extending from the slider tube, the bearing collar having a bearing cavity formed therein for receiving a bearing; and
   d. a stopper positioned at the shoulder of the outer body, the stopper being sized to fit snugly in the recess as a barrier to contaminants entering the outer body as the slider tube slides into and out of the outer body.

21. The assembly of claim 20 further including a collar shield covering a portion of the cavity as a barrier to contaminants entering the bearing cavity.

22. The assembly of claim 21 wherein the collar shield includes a shield leg that fits snugly against an inside surface of the bearing cavity.

23. The assembly of claim 20 wherein the stopper is a pliable seal against food and debris landing on the slider tube.

24. The assembly of claim 20 wherein the outer body is substantially rounded without flat sides on which debris could accumulate.

25. The assembly of claim 20 wherein the outer body is formed as a unitary body, and not two or more parts joined together, so that the outer body does not have debris-collecting crevices where two more parts have been joined together.

26. The assembly of claim 25 wherein the outer body is casted.

27. A telescoping belt tightening assembly for conveyor systems, the belt tightening assembly including:
   a. an elongated outer body including:
      (1) an opening extending therethrough,
      (2) at least one pedestal protruding radially outwardly therefrom, the pedestal having an aperture extending therethrough for receiving a fastener, (3) a forward shoulder formed at a terminal forward end of the outer body, the forward shoulder defining a forward recess formed circumferentially about the outer body, (4) a rear shoulder formed at a rear end of the outer body, the rear shoulder defining a rear recess formed circumferentially about the outer body;

b. a slider tube sized to be receivable in the opening of the outer body, the slider tube being adjustably securable to the outer body such that the slider tube is extendable out of the outer body to varying lengths;

c. a forward stopper positioned at the forward shoulder, the forward stopper being sized to fit snugly in the recess as a barrier to contaminants entering the outer body as the slider tube slides into and out of the outer body; and d. a second stopper sized to fit snugly in the rear recess as a barrier to contaminants entering the outer body from the rear end.

28. The assembly of claim 27 further including a bearing collar extending from the slider tube, the bearing collar having a bearing cavity formed therein for receiving a bearing.

29. The assembly of claim 27 wherein the slider tube includes an internally-threaded tube aperture, the slider tube being sized to be receivable in the opening of the outer body.

30. The assembly of claim 29 further including an adjustment assembly having:

a. a threaded rod configured to be received in the slider tube by threadably engaging the tube aperture;

b. an adjuster protruding from a back end of the outer body, the adjuster being fixed to the threaded rod such that turning the adjuster will also turn the threaded rod to screw the threaded rod into and out of the tube aperture, wherein:

1) screwing the threaded rod out of the tube aperture urges the slider tube out from a front end of the outer body, the front end of the outer body opposing the back end of the outer body; and 2) screwing the threaded rod into the tube aperture retracts the slider tube into the front end of the outer body.

31. The assembly of claim 27 further including an adjuster which is manipulatable to adjust how far the slider tube extends out of the outer body, wherein the adjuster is a unitary body, and not two or more parts joined together, such that the adjuster does not have debris-collecting crevices at intersections of parts joined together.

32. A telescoping belt tightening assembly for conveyor systems, the belt tightening assembly including:

a. an elongated outer body with an opening extending therethrough, the outer body terminating in a shoulder that defines a recess formed circumferentially about the outer body;

b. a slider tube:
(1) having an internally-threaded tube aperture,
(2) being sized to be receivable in the opening of the outer body, and
(2) being adjustably securable to the outer body such that the slider tube is extendable out of the outer body to varying lengths; and c. a stopper positioned at the shoulder of the outer body, the stopper being sized to fit snugly in the recess as a barrier to contaminants entering the outer body as the slider tube slides into and out of the outer body.

33. The assembly of claim 32 further including a bearing collar extending from the slider tube, the bearing collar having a bearing cavity formed therein for receiving a bearing.

34. A telescoping belt tightening assembly for conveyor systems, the belt tightening assembly including:

a. an elongated outer body with an opening extending therethrough, the outer body terminating in a shoulder that defines a recess formed circumferentially about the outer body;

b. a slider tube sized to be receivable in the opening of the outer body, the slider tube being adjustably securable to the outer body such that the slider tube is extendable out of the outer body to varying lengths;

c. a stopper positioned at the shoulder of the outer body, the stopper being sized to fit snugly in the recess as a barrier to contaminants entering the outer body as the slider tube slides into and out of the outer body; and d. an adjuster which is manipulatable to adjust how far the slider tube extends out of the outer body, wherein the adjuster is a unitary body, and not two or more parts joined together, such that the adjuster does not have debris-collecting crevices at intersections of parts joined together.

35. The assembly of claim 34 further including a bearing collar extending from the slider tube, the bearing collar having a bearing cavity formed therein for receiving a bearing.

* * * * *